United States Patent [19]

Salzgeber

[11] Patent Number: 4,476,837
[45] Date of Patent: Oct. 16, 1984

[54] METHOD AND SYSTEM FOR FUEL INJECTION TIMING

[75] Inventor: Daniel E. Salzgeber, Windsor, Conn.

[73] Assignee: Stanadyne, Inc., Windsor, Conn.

[21] Appl. No.: 447,535

[22] Filed: Dec. 7, 1982

[51] Int. Cl.³ ............................................. F02M 59/20
[52] U.S. Cl. .................................... 123/502; 123/501
[58] Field of Search ............... 123/502, 501, 357, 494; 73/119 A; 417/462

[56] References Cited

U.S. PATENT DOCUMENTS

| 3,511,088 | 5/1970 | Weaver | 73/119 A |
| 3,731,527 | 5/1973 | Weaver | 73/119 A |
| 4,033,310 | 7/1977 | Nicolls | 123/502 |
| 4,224,916 | 9/1980 | Davis | 123/502 |
| 4,329,961 | 5/1982 | Johnston | 123/502 |

FOREIGN PATENT DOCUMENTS

| 49703 | 4/1982 | European Pat. Off. | 123/501 |
| 54-137526 | 10/1979 | Japan | 123/502 |
| 57-13236 | 1/1982 | Japan | 123/502 |

Primary Examiner—Magdalen Y. C. Moy
Attorney, Agent, or Firm—Prutzman, Kalb, Chilton & Alix

[57] ABSTRACT

A fuel pump timing system having a hydraulic pressure transducer mounted for sensing a reaction hydraulic pulse to each fuel injection pressure pulse, a stepper motor for adjusting the fuel injection pump timing, engine sensors for sensing an engine reference position and certain engine operation data and a microprocessor connected to the transducer and engine sensors and operable for calculating the optimum and actual angles of fuel injection and for controlling the stepper motor to adjust the fuel injection pump timing in accordance with the difference between the optimum and actual angles of fuel injection.

23 Claims, 4 Drawing Figures

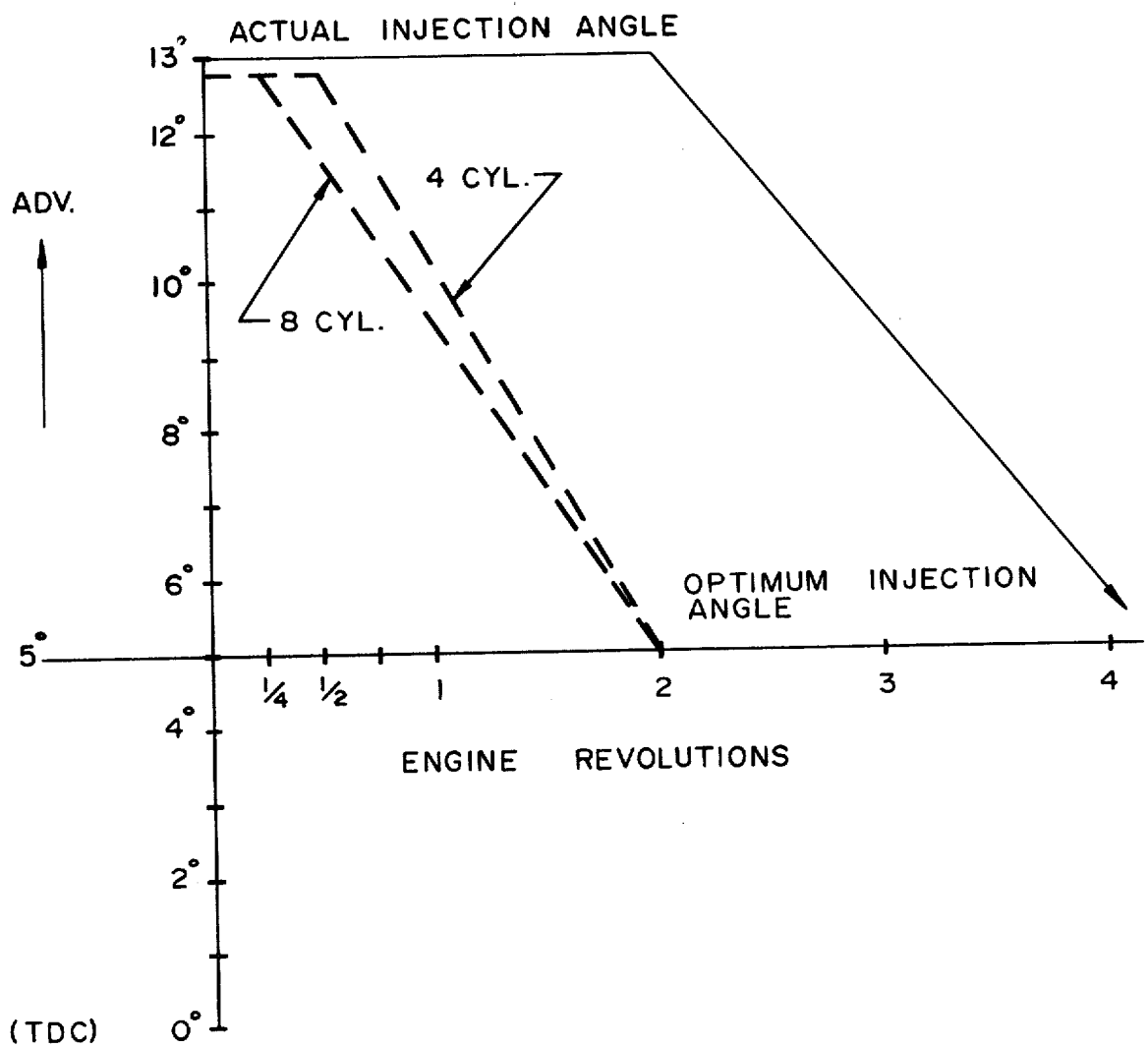

METHOD AND SYSTEM FOR FUEL INJECTION TIMING

DESCRIPTION

TECHNICAL FIELD

The present invention relates generally to fuel injection systems of the type having a fuel injection pump for delivering high pressure liquid fuel pulses to the fuel injection nozzles of an internal combustion engine for injection of discrete charges of fuel into the engine cylinders. More particularly, the present invention relates to a new and improved fuel injection timing method and system for determining and regulating the timing of the fuel charge injection.

BACKGROUND AND DISCLOSURE OF INVENTION

Precise timing of the fuel charge injection into an engine cylinder (usually measured in relation to the top dead center (TDC) postion of the cylinder operating piston) is a critical factor in maximizing the fuel efficiency of the engine and in minimizing the engine noise level and the pollutant discharge in the engine exhaust. Also, precise regulation of fuel charge injection timing is necessitated by increasing environmental considerations and regulatory mandates. Improved injection timing can be achieved by employing a more precise means for controlling the fuel injection timing and also by employing more engine operation parameters in determining the optimum timing.

In fuel injection pump timing systems having a high degree of precision, the means provided for advancing and retarding the fuel injection timing may be responsive to a control loop which periodically receives an update of the actual fuel injection timing for determining and applying the desired timing adjustment. According to the present invention, increased timing precision is obtained by precisely determining the fuel injection timing at the beginning of each fuel injection event and initiating a corresponding timing adjustment prior to the succeeding fuel injection event.

Fuel charge injection normally occurs when the piston is at or near TDC. The desired time of fuel charge injection varies with the engine design and ranges from slightly prior to TDC to slightly after TDC. Quantification of fuel injection timing is commonly determined and expressed in terms of degrees of crankshaft rotation relative to TDC.

In the normal course of engine operation, various engine operation data or parameters such as engine speed, load, temperature, and altitude or intake manifold pressure may vary sufficiently to require timing adjustments to maintain optimum fuel injection timing. For example, as the engine speed increases, the fuel injection timing should normally occur earlier relative to TDC. That is because the time required for fuel combustion (in terms of crankshaft degrees) increases with engine speed and therefore should be considered in determining the optimum fuel injection timing. Accordingly, the usual fuel injection pump normally employs a mechanism for adjusting the fuel injection timing with engine speed.

Another change in the engine operation which requires a timing adjustment is the change in the engine load or quantity of the injected fuel charge. For example, advancing the fuel injection timing for rapid engine acceleration is generally advantageous. Also, a timing adjustment may be made to compensate for engine temperature. Thus, it is generally advantageous to advance the fuel injection timing in cold engine operation at relatively low speed. A fourth factor for which a compensating adjustment of the fuel injection timing is desirable is the engine altitude for example as measured by the intake manifold pressure. In general, the fuel injection timing should be advanced as the altitude increases or the intake manifold pressure decreases. Other factors, such as pump wear and fuel density, may also require a timing adjustment to obtain optimum timing.

In fuel injection pumps of the type wherein the contour of a cam activates the fuel pressurizing plungers of a charge pump, the fuel injection timing may be controlled by an hydraulically operated timing control piston connected to advance or retard the charge pump timing.

Means for regulating the fuel injection timing by controlling the position of a timing control piston under various engine operating conditions have been devised such as that disclosed in U.S. Pat. No. 4,224,916 of Charles W. Davis, dated Sept. 30, 1980 and entitled "Timing Control for Fuel Injection Pump". The present invention is essentially directed to improvements in determining the timing of the fuel injection event and in reducing the response time for effecting a timing adjustment. In accordance with the present invention, the timing adjustment is preferably implemented by adjusting the position of the timing control piston.

Prior art references disclose methods and systems for measuring the fuel injection timing by either sensing the movement of the fuel injection nozzle valve, sensing an increase in the fuel pressure at the fuel injection nozzle, or by sensing the expansion of the fuel injection line.

U.S. Pat. No. 3,511,088 of P. R. Weaver dated May 12, 1970 and entitled "Pressure Transducer and Timing System" discloses a timing system in which a pressure transducer is clamped to a fuel line to detect and signal the onset of fuel injection in response to expansion of the fuel line. U.S. Pat. No. 3,731,527 of Preston R. Weaver, dated May 8, 1973, and entitled "Fuel Injection Transducer and Timing System" discloses a transducer mounted at the fuel injection nozzle to detect the shock wave caused by the opening of the nozzle at the instant of fuel injection.

The deficiences of the prior art are particularly manifest either in restricting the fuel injection detection to only a single engine cylinder rather than all cylinders, which ultimately degrades the timing adjustment response time, or in requiring a separate detection device for each engine cylinder, thereby making the system expensive and complex. The prior art systems have additional problems in terms of providing detection means which accurately and reliably senses the fuel injection event over the normally wide range of engine operating characteristics and in the adverse fuel injection nozzle environment. THe devices which are integrally built into the injection nozzle structure are impractical and expensive.

DISCLOSURE OF THE INVENTION

The present invention represents an improvement over the prior art in terms of providing a new and improved timing method and system to accurately detect the fuel injection event. The present invention employs a single sensor for detecting the fuel injection event at each of the engine cylinders and for providing an updated timing signal for the succeeding fuel injection event. The present invention provides a very efficient and fast acting adjustment response. Furthermore, in accordance with the present invention the fuel injection sensor is not positioned in the vicinity of the injection nozzle structure where it is subject to maximum temperature and vibration.

The present invention has notable utility with a fuel injection pump of the type having an hydraulically operated timing piston to vary the fuel injection timing and in a preferred form comprises a sensor positioned to sense an hydraulic reaction pulse to each fuel injection pulse transmitted through the timing piston to the hydraulic fluid (fuel) in the hydraulic advance or operating chamber of the timing piston. The sensor which is preferably a pressure wave transducer, detects a pressure spike created by the reaction force to each pumping event. The signal from the transducer is processed along with other engine operation data or parameters to determine the actual fuel charge injection timing, determine the optimum angle of fuel injection, compare the optimum angle with the actual angle of fuel injection, and generate a timing adjustment signal to adjust the position of the timing piston. In a preferred form, a microprocessor is employed to facilitate the accomplishment of the foregoing.

An object of the present invention is to provide a new and improved fuel injection timing method and system for determining and regulating the timing of a fuel injection pump.

Another object of the present invention is to provide a new and improved timing method and system which employs a single detector or sensor for detecting the fuel injection event at each engine cylinder.

Still another object of the invention is to provide a new and improved fuel injection timing method and system having an improved response time for effecting a timing adjustment.

A further object of the invention is to provide a new and improved timing method and system which is reliable, durable and relatively inexpensive.

A still further object of the invention is to provide a new and improved timing method and system which employs a microprocessor for determining the optimum angle of fuel charge injection and for effecting a timing adjustment of the fuel injection pump.

Other objects and advantages of the invention will become apparent from the specification and accompanying drawings.

BRIEF DESCRIPTION OF THE DRAWINGS

FIG. 4 is a graph illustrating the improved timing adjustment response time provided by the invention.

DESCRIPTION OF PREFERRED EMBODIMENT

Figure 1:
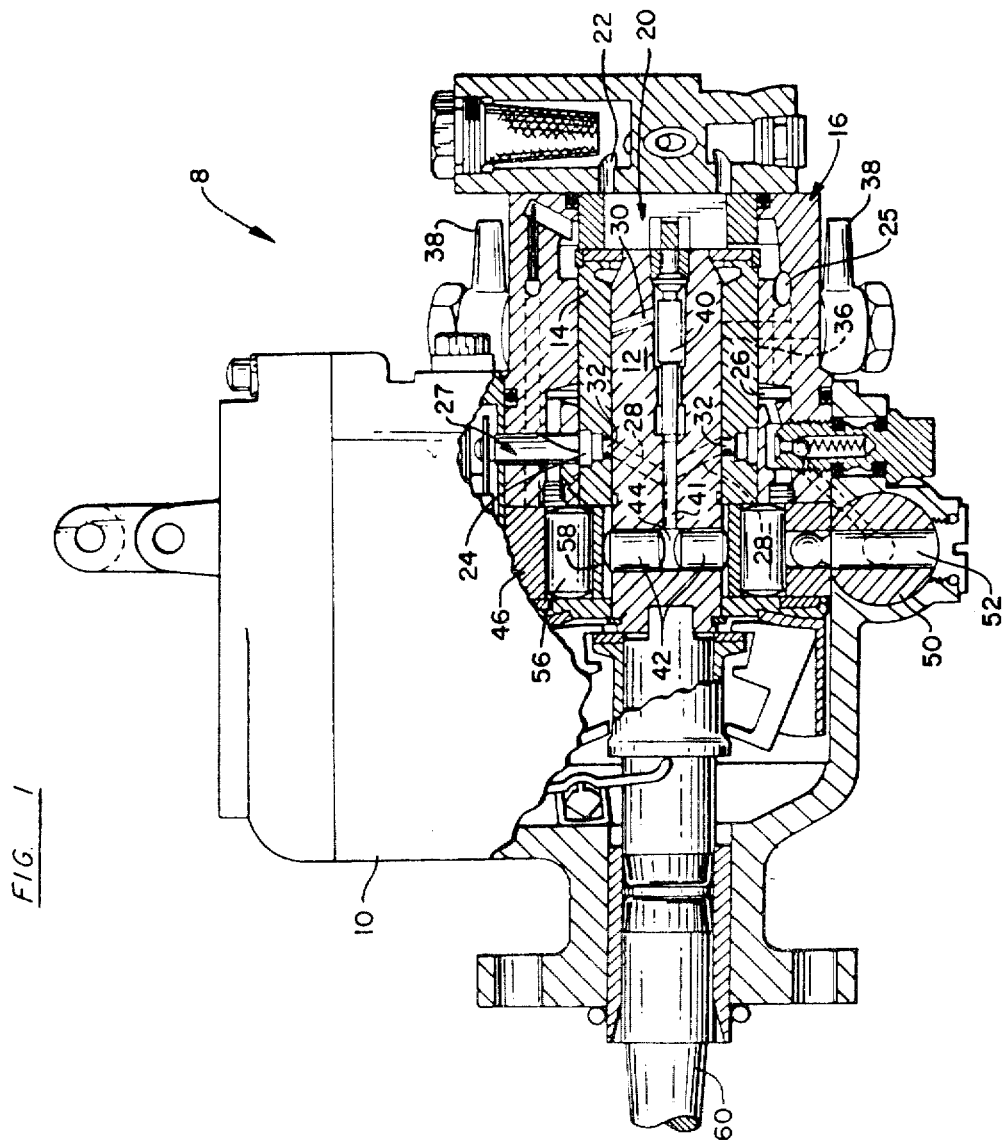
FIG. 1 is a side view, partly broken away and partly in section, of an exemplary fuel injection pump of a type with which the fuel injection timing method and system of the present invention may be employed.

With reference to FIG. 1, an exemplary fuel injection pump 8 of the type commercially used with compression-ignition or diesel engines is shown for purposes of illustrating the present invention. The pump 8 includes a housing 10 and a distributor rotor 12 journaled within a fuel distributor sleeve 14 of a hydraulic distributor head 16 of the pump housing 10.

A low pressure vane type transfer pump 20 is provided at one end of the rotor 12. The transfer pump has an inlet 22 to which fuel is supplied from a supply tank (not shown). The outlet of the transfer pump 20 is connected to a fuel inlet annulus 24 in the sleeve 14 via a passage 25 and an annulus 26 in the hydraulic distributor head 16 and via a fuel inlet metering valve 27.

The rotor 12 has a pair of fuel inlet passages 28 and a fuel discharge passage 30. As the rotor 12 turns, the inlet passages 28 register sequentially with a plurality of radial ports 32 (only two of which are shown) uniformly spaced around the sleeve 14 in a plane of rotation of the inlet passages 28 to provide periodic communication by the fuel inlet annulus 24 with the inlet passages 28 for supplying fuel to the rotor 12. Similarly, the discharge passage 30 communicates sequentially with a plurality of fuel outlet passages 36 (only one of which is shown). The fuel outlet passages 36 are uniformly spaced around the sleeve 14 in the plane of rotation of the discharge passage 30 so that the rotor 12, as it rotates, sequentially delivers pressurized fuel pulses to a plurality of fuel connectors 38 for delivery of the pressurized fuel pulses to the respective fuel injection nozzles of the associated engine (not shown) for injection of fuel charges into the engine cylinders. A delivery valve 40 is mounted within an axial passage 41 in the rotor 12 to control the backflow of pressurized fuel from the discharge passage 30 after the fuel charge injection.

The rotor 12 has an enlarged generally cylindrical portion with a diametral bore receiving a pair of diametrically opposed pumping plungers 42. The space between the inner ends of the plungers 42 forms a high pressure pump chamber 44 connected to the inlet passages 28 and the discharge passage 30 by the axial passage 41 to alternately receive and discharge fuel as the rotor 12 turns.

Surrounding the plungers 42 in their plane of revolution is a generally circular cam ring 46. The cam ring 46 is mounted in a bore 48 of the housing 10 for limited angular movement. The angular position of the cam ring 46 is controlled by a timing or advance piston 50 which is mechanically connected to the cam ring 46 by a connector 52.

The cam ring 46 has an inner annular cam surface with a plurality of pairs of diametrically opposed inwardly projecting cam lobes 54 for periodically and simultaneously actuating the plungers 42 inwardly. A roller assembly comprising a roller 56 and a roller shoe 58 is disposed between each plunger 42 and the cam ring 46 so that the rollers 56 follow the cam surface to translate the cam contour into reciprocable movement of the plungers 42.

In operation, as the rotor 12 is driven by the associated engine (not shown) via the pump drive shaft 60, low pressure fuel from the transfer pump 20 is delivered through a port 32 to a rotor inlet passage 28 to the pump chamber 44, the opposed rollers 56 being angularly disposed with respect to the cam lobes 54 of the cam ring 46 to permit the plungers 42 to move radially outwardly in synchronism with the registry of an inlet passage 28 with each port 32 for fuel to enter the chamber 44. As the rotor 12 continues to rotate, the inlet passage 28 moves out of registry with the port 32 and the plungers 42 are actuated inwardly by a pair of opposed cam lobes 54 to produce a high pressure fuel pulse in the pump chamber 44. At the same time, the discharge passage 30 moves into registry with a delivery passage 36 connected to one of the engine cylinders (not shown) for delivery of a high pressure fuel pulse to the respective fuel injection nozzle for injection of a fuel charge into the engine cylinder.

Continued rotation of the rotor repeats the process for sequential delivery of a charge of fuel to each engine cylinder in proper synchronism with the engine rotation.

Figure 2:
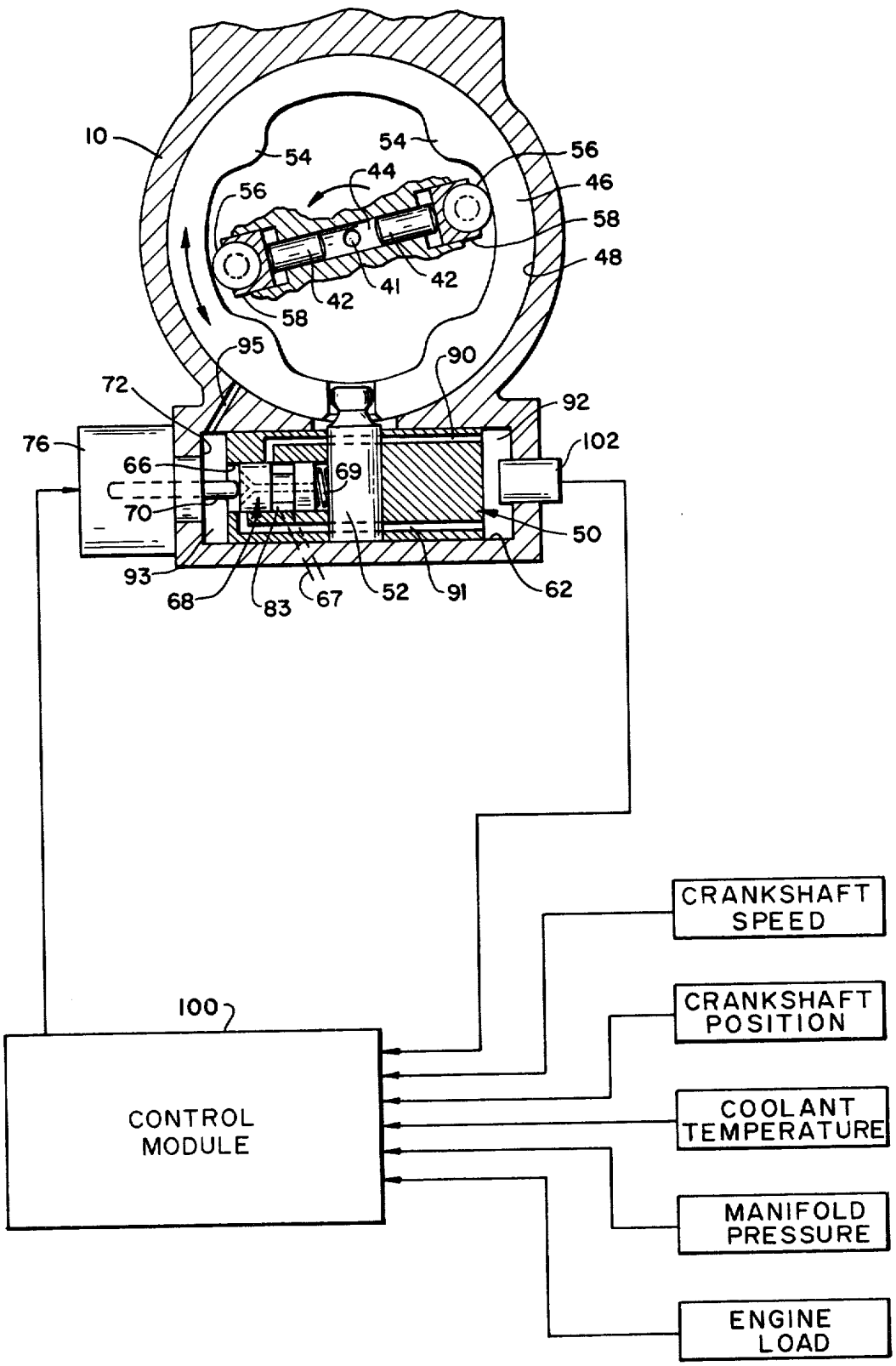
FIG. 2 includes a block diagram and a partial transverse section view, partly broken away and partly in section, of the pump of FIG. 1, showing a preferred embodiment of a fuel injection timing method and system of the present invention.

With reference to FIG. 2, the cam ring 46 is mounted so that it can be angularly adjusted to control the timing of the pumping strokes of the plungers 42. The pumping strokes can be adjusted to occur slightly sooner (advanced) or slightly later (retarded) as the drive shaft 60 rotates.

The timing piston 50 is mounted within a cylinder or bore 62 of the housing 10. The cylinder 62 extends tangentially to and in substantially the same plane as the cam ring 46. The control piston 50 has a radial bore receiving the connector 52, and an upper rounded portion of the connector 52 interacts with the cam ring 46 for angularly shifting the cam ring 46 with the piston 50.

The piston 50 has an axial bore 66 receiving a servo vavle or piston 68. The servo valve 68 is biased outwardly by a light compression spring 69 at the inner end of the servo valve bore 66. A shiftable servo valve operating pin 70 extends axially through an opening in the cylinder end wall 72 into engagement with the outer end of the servo valve 68 to establish the axial position of the servo valve 68. The inner end of the servo valve bore 66 is connected via an axial bore through the servo valve 68 to its opposite end to balance the fuel pressure on the opposite ends of the servo valve 68. The axial position of the pin 70 is controlled by a suitable bidirectional rotary stepping motor or actuator 76 mounted on the pump housing in axial alignment with the servo valve 68. The pin 70 is longitudinally positioned by the actuator 76 in response to a signal (i.e. advance and retard stepping pulses) received from a control module 100, the function of which will be described in detail below.

Fuel under a regulated pressure is supplied by the transfer pump 20 via a passage 67 to a servo valve piston annulus 83. When the servo valve 68 is shifted outwardly, to the left as viewed in FIG. 2, fuel is conducted to an advance or operating chamber 92 (at the right end of the cylinder 62 as shown in FIG. 2) via an inlet port of a passage 90 in the control piston 50. At the same time, the servo valve 68 covers an outlet port of an exhaust passage 91 to prevent flow of fuel from the chamber 92 to the outer low pressure end of the bore 66. The timing piston 50 is thereby hydraulically actuated to the left as viewed in FIG. 2 until the servo valve piston land covers the inlet port of passage 90 to terminate the flow of fuel to the chamber 92.

When the servo valve 68 is shifted inwardly by the pin 70, to the right as seen in FIG. 2, fuel is exhausted from the operating chamber 92 via the outlet passage 91. The timing piston 50 is thereby actuated to the right as viewed in FIG. 2 by the spring 69 until an equilibrium position of the timing piston 50 is attained. Accordingly, the timing piston 50 is hydraulically positioned to match the axial position of the servo valve 68 and therefore the axial position of the actuator pin 70.

With further reference to FIG. 2, a pressure sensor or transducer 102 is mounted at the end of the piston operating bore 62 for sensing hydraulic pressure spikes or pulses within the timing piston operating chamber 92. For each inward actuation or pumping stroke of the opposed plungers 42, a reaction force to the inward actuating force of the plungers 42 is transmitted via the plunger operating cam 46, connector pin 52 and the timing piston 50 to the hydraulic fluid (fuel) in the timing piston operating chamber 92. Because of the relative incompressibility of fuel, the reaction force produces a sharp hydraulic pressure pulse or spike in the operating chamber 92. Each such pressure spike is detected by the sensor 102, and the sensor generates and transmits a corresponding sharp electrical signal indicative of a fluid pressure spike occurrence. The pressure spike typically is of the order of 400-600 p.s.i. in the type of fuel injection pump shown and therefore significantly above the transfer fuel pressure within the operating chamber 92. The sensor 102 need not measure the magnitude of the pressure pulse and only the occurrence of a pulse at say 300 p.s.i. or above. Thus, the sensor 102 does not have to be calibrated and a relatively inexpensive sensor can be employed to provide a reliable pickup. Suitable transducers for this purpose are available under the name Celesco LD-25 or the name Drystal 6005.

The time t of the pressure spike signal leads by a time interval D, the time T of the corresponding actual fuel charge injection into the cylinder. The time interval D is considered to be a constant time interval which is dependent only on the physical characteristics of the fuel injection system, including that of the delivery fuel injection valve spring and the time it takes for the fuel injection pulse or pressure wave to travel the length of the fuel conduit from the fuel injection pump to the injection nozzle. Thus, $T = t + D$, where t is the time of the pressure spike signal, T is the time of fuel charge injection and D is a constant dependent on the physical characteristics of the fuel injection system.

For most fuel injection applications, quantification of the fuel charge injection time is preferably established with reference to the TDC position of the piston and the time T of fuel charge injection is expressed in terms of the angular displacement of the crankshaft in degrees relative to TDC. Therefore, the delay d in crankshaft degress betwen times T and t can be expressed by the relationship.

$$d = (K + L/S) \cdot RPM \cdot 360/60$$

where

K is a constant time delay in seconds resulting from the delivery valve spring;

L is the length of the fuel injection conduit in feet;

S is the speed of the fuel injection pressure pulse in feet per second; and

RPM is the engine speed in revolutions per minute.

The calculation of the actual angle of fuel charge injection is accomplished by an electronic control module 100 which preferably incorporates a suitable microprocessor. As illustrated in FIG. 2, the control module 100 also processes input signals indicative of measurements of certain engine operation data or parameters (in addition to the fuel injection timing signal provided by the transducer 102) In the shown embodiment, sensors are also provided to generate input signals representing the engine or crankshaft speed, crankshaft reference position (i.e. at predetermined reference positions of the crankshaft), coolant temperature, intake manifold pressure (or engine altitude), and engine load. Such signals are transmitted to the control module 100 to calculate with its microprocessor the optimum angle of fuel charge injection.

Figure 3:
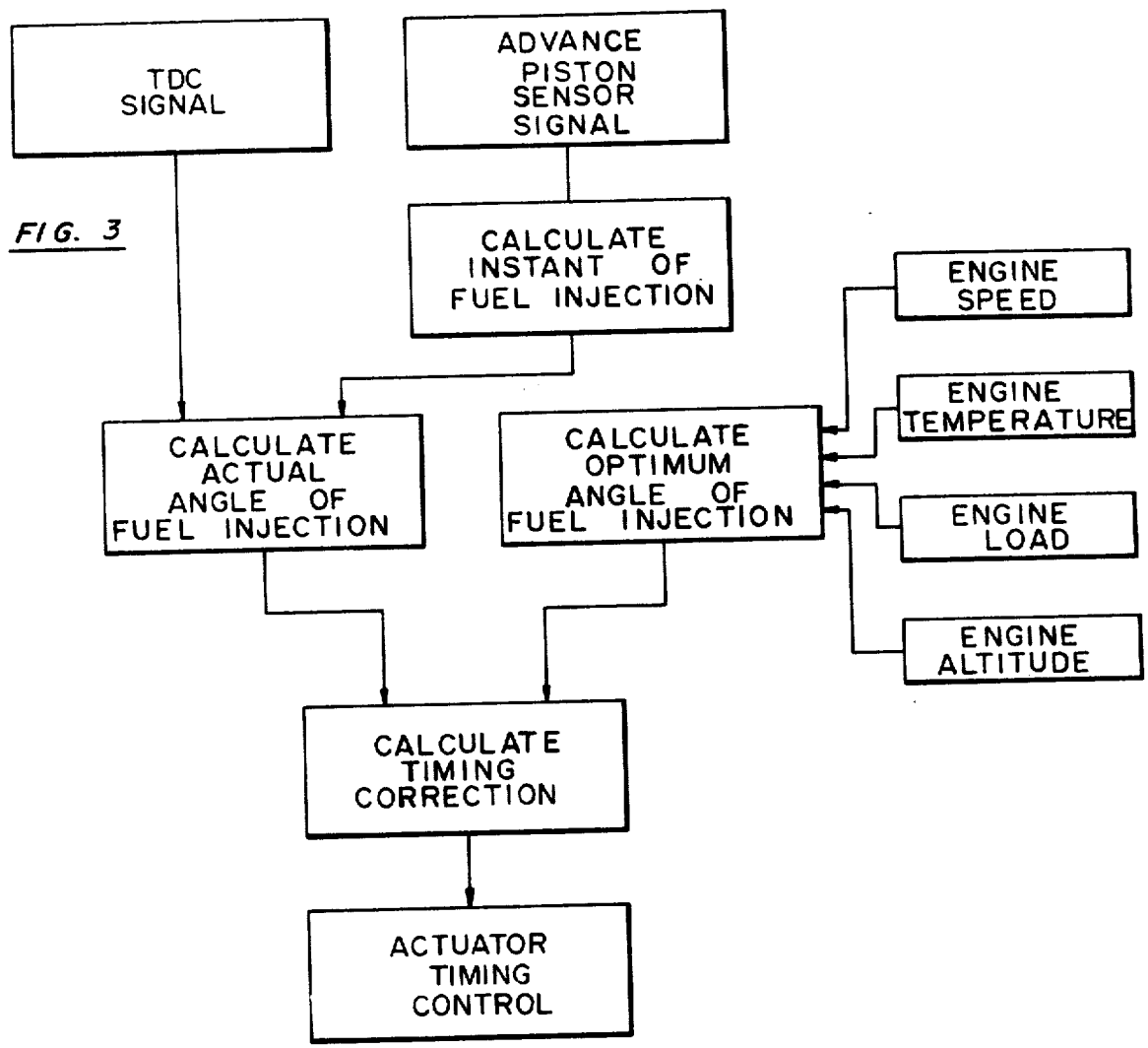
FIG. 3 is a block diagram illustrating the operational sequence of steps performed by the fuel injection method and system of the present invention.

With reference to the logic diagram set form in FIG. 3, the control module microprocessor provides for calculating the actual angle of fuel injection from the injection timing signal received from the timing sensor 102 and the engine timing signal received from the crankshaft reference position sensor and then compare the actual angle of fuel injection with the calculated optimum angle of fuel injection to produce an output signal indicative of a timing correction or adjustment to be applied to the timing actuator 76.

With further reference to FIG. 3, the actual angle of fuel injection is determined from the engine reference signals and the fuel injection pulse signals received from the sensor 102. A common means of detecting TDC employs a reference mark on the crankshaft or flywheel and a magnetic pickup which magnetically senses each reference mark and generates a reference signal as each reference mark rotates into alignment with the pickup. Preferably, in the case of a four-cylinder engine, a pair of reference marks spaced 180 deg. apart are employed; for a six-cylinder even firing engine, three reference marks are employed spaced 120 deg. apart; and for an eight-cylinder engine, four reference marks are employed spaced 90 deg. apart. The actual angle of fuel charge injection relative to TDC may then be determined by the microprocessor based conftrol module 100 by counting the number of independently generated clocking signals and counting the number of clocking signals between each crankshaft reference signal and a fuel injection pulse signal generated by the transducer 102. The clocking signals are generated at a fixed predetermined high frequency for example at intervals of the order of two microseconds. The individual computation steps for determining the actual angle of fuel charge injection may be made practically simultaneously. The essence of the computation procedure is to use the signal from the sensor or transducer 102 which indicates the occurrence of the pressure spike to calculate the actual instant of fuel charge injection into the engine cylinder with reference to the occurrence of TDC.

In the preferred embodiment of the timing system shown in FIG. 3, a timing correction factor is calculated and a corresponding correction signal is generated which corresponds to the desired timing correction. The correction signal is applied to the timing actuator 76 to effect a corrective timing adjustment of the fuel injection pump (in the manner previously described). The timing adjustment represents the difference between the calculated optimum angle of fuel charge injection and the calculated actual angle of fuel charge injection.

The optimum angle of fuel charge injection may be fixed at a constant such as five degrees in advance of top dead center. However, the optimum angle of fuel charge injection preferably is treated as a variable and continuously recalculated as a function of one or more engine operation parameters such as engine speed, engine load, engine temperature and engine altitude or intake manifold pressure. Measurements of the latter parameters may be continuously accomplished by suitable engine sensors. Also, a suitable algorithm or data base is used by the microprocessor based control module 100 for calculating the optimum angle of fuel injection in accordance with the input data received from the engine sensors.

With reference to FIGS. 2 and 3, the calculation of the instant of fuel charge injection, actual angle of fuel charge injection relative to TDC, optimum angle of fuel charge injection relative to TDC and the desired timing adjustment or correction are accomplished by the control module 100 by means of its microprocessor. As shown schematically in FIG. 2, in a preferred embodiment of the timing system, suitable sensors or pickups shown in block diagram provide (a) an input signal to the control module 100 indicative of each crankshaft reference position (at TDC or a fixed angular position relative to TDC), (b) an input signal indicative of engine speed, (c) an input signal indicative of engine temperature, (d) an input signal indicative of manifold pressure (which in turn is a function of engine altitude), and (e) an input signal indicative of engine load (e.g. engine throttle setting). The output signal from control module 100 (which is provided in the form of advance or retard stepping pulses) represents the calculated timing adjustment or correction based on the input signals. The output timing adjustment or correction signal is applied to the stepping motor 76 to adjust the timing of the fuel injection pump.

With reference to FIG. 4, the advantages provided by the present invention over conventional timing systems in terms of corrective response time and the frequency of the control loop update are illustrated for a condition where the engine is operating at a fuel injection timing angle of five degrees in advance of TDC and the actual fuel injection angle abruptly changes say, to thirteen degrees in advance of TDC for example due to a rapid acceleration of the engine from idle speed. An uncorrected timing change of such an amount which remains uncorrected for two or more revolutions results in smokey and noisy engine performance.

As shown by a solid line in FIG. 4, in timing systems which detect the onset of fuel injection for one cylinder only, an abrupt change in the fuel injection angle may not be detected for up to two engine revolutions. Consequently, a timing correction will not be applied to commence correction of the fuel injection timing until up to two engine revolutions after the abrupt change in the actual angle of fuel injection.

Because the sensor 102 is mounted to detect each pumping stroke, the method and system of the present invention provides a signal for calculating the actual angle of fuel charge injection for each fuel injection event. Hence, for each fuel injection event, a timing correction is determined and an appropriate signal is applied to the stepping motor 76 of the fuel injection pump to adjust the fuel injection timing for the succeeding fuel injection event. As shown by dotted lines in FIG. 4, in the case of a four-cylinder engine, the timing system commences an appropriate timing adjustment within a maximum of 180 deg. revolution of the crankshaft and in the case of an eight cylinder engine, within a maximum of 90 deg. revolution of the crankshaft.

Because the timing system provides a timing input signal for each fuel charge injection event, the timing input signals from the sensor 102 can also be used to trigger a timing light or control the spark ignition timing of spark ignition engines including multi-fuel stratified charge engines.

For some applications of the timing system, the wide variations in operating conditions of the engine may necessitate the conditioning or filtering of the signal from the sensor 102 in order to obtain optimum performance of the timing system over the entire range of engine operating conditions.

As will be apparent to persons skilled in the art, various modifications, adaptations and variations of the foregoing specific disclosure can be made without departing from the teachings of the present invention.

I claim:

1. A method of timing a fuel injection system of an internal combustion engine having a fuel injection pump driven by the engine and a fuel injection nozzle for each engine cylinder; the fuel injection pump having fuel pumping means, synchronized means, including pump actuating means for periodically actuating the pumping means, synchronized with the internal combustion engine for delivering respective high pressure fuel injection pulses to the fuel injection nozzles in succession for injection of fuel charges into the engine cylinders, the pump actuating means being shiftable in advance and retard opposite directions thereof to advance and retard the fuel injection pulse timing, a hydraulic cylinder, a timing control piston mechanically connected to the pump actuating means and shiftable within the hydraulic cylinder in advance and retard opposite directions thereof for mechanically shifting the pump actuating means in advance and retard directions thereof respectively, and hydraulic control means for hydraulically positioning the timing control piston within the hydraulic cylinder; the method comprising sensing in said hydraulic cylinder a reaction hydraulic pulse to the actuation of the fuel pumping means by the pump actuating means and generating an electrical fuel injection pulse timing signal for said reaction pulse for timing the fuel charge injection.

2. A method of timing a fuel injection system of an internal combustion engine, having a fuel injection pump driven by the engine and a fuel injection nozzle for each engine cylinder; the fuel injection pump having fuel pumping means, synchronized means, including pump actuating means for periodically actuating the fuel pumping means, synchronized with the internal combustion engine for delivering respective high pressure fuel injection pulses to the fuel injection nozzles in succession for injection of fuel charges into the engine cylinders, the pump actuating means being shiftable in advance and retard opposite directions thereof to advance and retard the fuel injection pulse timing respectively, and hydraulic control means for hydraulically positioning the pump actuating means, the method comprising sensing a reaction pulse to the actuation of the fuel pumping means by the pump actuating means and generating an electrical fuel injection pulse timing signal for said reaction pulse for timing the fuel charge injection.

3. A method of timing a fuel injection system according to claim 2 wherein said reaction pulse is a reaction hydraulic pulse in the hydraulic control means to the actuation of the fuel pumping means by the pump actuating means.

4. A method of timing a fuel injection system according to claim 1, 2 or 3 wherein said sensing step comprises sensing a said reaction pulse for each successive fuel injection pulse and generating a said electrical fuel injection pulse timing signal for each of said reaction pulses.

5. A method of timing a fuel injection system according to claim 1, 2, or 3 wherein said sensing step comprises sensing a said reaction pulse for a fuel injection pulse for each of the fuel injection nozzles of the internal combustion engine and generating a said electrical fuel injection pulse timing signal for each of said reaction pulses.

6. A method of timing a fuel injection system according to claim 1, 2 or 3 further comprising the steps of generating engine operation signals representing engine speed, engine reference timing and other predetermined engine operation parameters, calculating a fuel injection timing adjustment from said pulse timing signals and said engine operation signals, and operating the hydraulic control means for adjusting the fuel injection timing in accordance with said calculated timing adjustment.

7. A method of timing a fuel injection system according to claim 5 further comprising the steps of generating engine operation signals representing predetermined engine operation parameters, calculating a fuel injection timing adjustment from said pulse timing signals and engine operation signals, and operating the hydraulic control means for adjusting the fuel injection timing in accordance with said calculated timing adjustment.

8. In a fuel injection pump for an internal combustion engine having a fuel injection nozzle for each engine cylinder; the fuel injection pump having a rotary input adapted to be driven by the engine, fuel pumping means, synchronized means, including pump actuating means for periodically actuating the pumping means, synchronized with the internal combustion engine for delivering respective high pressure fuel injection pulses to the fuel injection nozzles in succession for injection of fuel charges into the engine cylinders, the pump actuating means being shiftable in advance and retard opposite directions thereof to advance and retard the fuel injection pulse timing respectively, a hydraulic cylinder, a timing control piston mechanically connected to the shiftable actuatng means and shiftable within the hydraulic cylinder in advance and retard opposite directions thereof for mechanically shifting the pump actuating means in advance and retard directions thereof respectively, and hydraulic control means for hydraulically positioning the timing control piston within the hydraulic cylinder, the improvement wherein the fuel injection pump further comprises sensor means for sensing reaction hydraulic pressure pulses within the hydraulic cylinder to the actuation of the fuel pumping means by the shiftable pump actuating means and operable for generating an electrical fuel injection pulse timing signal for each said reaction hydraulic pulse for timing the fuel charge injection.

9. In a fuel injection pump for an internal combustion engine having a fuel injection nozzle for each engine cylinder, the fuel injection pump having a rotary input adapted to be driven by the engine for operating the pump and synchronizing the pump with the engine, fuel pumping means, synchronized means, including pump actuating means for periodically actuating the fuel pumping means, synchronized with the internal combustion engine for delivering respective high pressure fuel injection pulses to the fuel injection nozzles in succession for injection of fuel charges into the engine cylinders, the pump actuating means being shiftable in advance and retard opposite directions thereof to advance and retard the fuel injection pulse timing respectively, and hydraulic control means for hydraulically positioning the actuating means, the improvement wherein the fuel injection pump further comprises sensor means for sensing reaction pulses to the actuation of the fuel pumping means by the shiftable pump actuating means and operable for generating an electrical fuel injection pulse timing signal for each said reaction pulse for timing the fuel charge injection.

10. A fuel injection pump according to claim 9 wherein said reaction pulse is a reaction hydraulic pulse in the hydraulic control means to the actuation of the fuel pumping means by the pump actuating means.

11. A fuel injection pump according to claim 8, 9 or 10 further comprising timing adjustment means for receiving engine operation signals representing engine timing and other predetermined engine operation parameters and for adjusting the hydraulic control means in accordance with the said pulse timing signals and said engine operation signals.

12. A fuel injection timing system for a fuel injection pump having pumping means to deliver discrete charges of liquid fuel in successive pumping strokes sequentially to cylinders of an associated engine, timing means, including a hydraulic cylinder and a timing control piston axially shiftable within the hydraulic cylnder, to vary the timing of the pumping strokes relative to the operation of the associated engine, the hydraulic cylinder having a hydraulic operating chamber for establishing the axial position of the control piston within the hydraulic cylinder; the fuel injection system comprising sensor means for generating a fuel injection pulse timing signal in response to a pumping stroke of the pumping means; detection means for generating reference timing signals of engine position; processing means connected to said sensor means and detection means to calculate the actual fuel injection timing from the fuel injection pulse timing signals and reference timing signals; the processing means also being adapted to receive signals indicative of at least one other engine operation parameter indicative of engine speed, engine load, engine temperature or altitude and operable to determine the optimum fuel injection timing based thereon; the processing means being operable to provide a timing adjustment signal indicative of the difference between the actual and optimum fuel injection timing, and timing actuator means responsive to said timing adjustment signal to adjust the position of the timing control piston in accordance with said difference.

13. A fuel injection timing system according to claim 12 wherein the sensor means generates a fuel injection pulse timing signal in response to a hydraulic pressure pulse in said hydraulic operating chamber resulting from the reaction force to the pumping stroke transmitted via the control piston to the hydraulic operating chamber.

14. A fuel injection timing system according to claim 13 wherein the sensor means is a transducer.

15. A fuel injection timing system according to claim 12 wherein the processing means comprises a microprocessor.

16. In a fuel injection pump having pumping means to deliver discrete charges of liquid fuel in successive pumping strokes sequentially to cylinders of an associated engine, timing means including a hydraulic cylinder and a timing control piston axially shiftable in the hydraulic cylinder to vary the timing of the pumping stroke relative to the operation of the associated engine, the hydraulic cylinder having a hydraulic operating chamber for establishing the axial position of the control piston within the hydraulic cylinder, the improvement wherein the fuel injection pump further comprises a transducer positioned to detect a hydraulic pressure pulse in said hydraulic operating chamber caused by each pumping stroke of the pumping means, the transducer being operative to produce a fuel injection pulse timing signal for each said hydraulic pressure pulse and processor means responsive to said timing signal and operable to determine therefrom the actual timing of fuel charge injection.

17. A fuel injection pump according to claim 16 wherein the processor means has input means for receiving engine timing reference signals indicative of the timing of predetermined reference positions of the engine, and the processor means is operable to determine the fuel injection timing relative to the engine operation based on the fuel injection pulse timing signals and the engine timing reference signals.

18. A method of determining the instant of fuel injection into a cylinder of an internal combustion engine by a fuel injection system having a fuel injection pump with pumping means periodically actuated to deliver high pressure pulses of liquid fuel in successive pumping strokes of the pumping means sequentially to the cylinders of the associated engine for injection of discrete charges of liquid fuel into the engine cylinders, said method comprising the steps of sensing from within the pump a hydraulic pressure pulse produced by each pumping stroke of the pumping means; producing a pressure pulse timing signal indicative of the occurrence of each said hydraulic pressure pulse; and processing said pressure pulse signal to determine the acutal time of fuel charge injection.

19. A method according to claim 18 wherein the sensing, producing and processing steps are cyclically repeated for each cylinder of the engine.

20. A method according to claim 18 further comprising the steps of calculating an optimum time of fuel injection based on predetermined engine operation parameters; comparing the actual time of fuel injection with the calculated optimum time of fuel injection; and producing a timing adjustment signal according to the difference therebetween.

21. A method according to claim 20 further comprising the step of adjusting the timing of the pumping strokes of said pump in response to said timing adjustment signal.

22. A method according to claim 21 wherein said steps are cyclically repeated for each of the cylinders of the engine.

23. A method according to claim 18 further comprising the step of detecting predetermined timing reference positions of the engine, and wherein the processinag step includes the step of determining the time of fuel charge injection into each engine cylinder relative to the top dead center position of its piston.

* * * * *